(12) United States Patent
Vilkhovyi et al.

(10) Patent No.: US 11,921,934 B2
(45) Date of Patent: Mar. 5, 2024

(54) CALIBRATION DEVICE AND METHOD FOR AN ELECTRONIC DISPLAY SCREEN FOR TOUCHLESS GESTURE CONTROL

(71) Applicant: AMERIA AG, Heidelberg (DE)

(72) Inventors: Ihor Vilkhovyi, Dossenheim (DE); Martin Seiler, Ehrenkirchen (DE)

(73) Assignee: AMERIA AG, Heidelberg (DE)

( * ) Notice: Subject to any disclaimer, the term of this patent is extended or adjusted under 35 U.S.C. 154(b) by 0 days.

(21) Appl. No.: 17/896,803

(22) Filed: Aug. 26, 2022

(65) Prior Publication Data

US 2023/0324999 A1 Oct. 12, 2023

(30) Foreign Application Priority Data

Apr. 8, 2022 (EP) ..................... 22167385

(51) Int. Cl.
*G06F 3/01* (2006.01)
*G06V 40/20* (2022.01)

(52) U.S. Cl.
CPC .............. *G06F 3/017* (2013.01); *G06V 40/28* (2022.01)

(58) Field of Classification Search
CPC ................................ G06F 3/017; G06V 40/28
See application file for complete search history.

(56) References Cited

U.S. PATENT DOCUMENTS

| | | | |
|---|---|---|---|
| 2014/0168367 A1* | 6/2014 | Kang .................. | G06T 7/85 348/46 |
| 2017/0091910 A1* | 3/2017 | Surazhsky ............ | H04N 9/3179 |
| 2018/0055578 A1* | 3/2018 | Richmond ............. | A61B 34/25 |
| 2019/0114801 A1 | 4/2019 | Shimaoka et al. | |

FOREIGN PATENT DOCUMENTS

EP 3508812 A1 7/2019

OTHER PUBLICATIONS

International Search Report and Written Opinion issued in International Patent Application No. PCT/EP2023/059330 dated Jul. 4, 2023.
Extended European Search Report issued in European Application No. 22167385.8 dated Sep. 29, 2022.

* cited by examiner

*Primary Examiner* — Adam R. Giesy
(74) *Attorney, Agent, or Firm* — MARSHALL, GERSTEIN & BORUN LLP (57) ABSTRACT

A calibration device 100 for use in a calibration process of an electronic display screen 200 for touchless gesture control, the calibration device 100 comprising:
a main body 102 defining a main axis 101 of the calibration device 100, wherein the main axis 101 extends from a proximal end 102a to a distal end 102b of the main body 102; a first foot 109a at the distal end 102b, the first foot 109a having a footing surface 110 being placeable on the electronic display screen 200 such that the footing surface 110 is in contact with and parallel to the electronic display screen 200, wherein the footing surface 110 is oriented at a predetermined angle, in particular 90°, with respect to the main axis 101 of the calibration device 100; a calibration pattern 103 comprising a machine-readable code being detectable by one or more optical sensors 300, in particular one or more depth cameras, wherein the one or more optical sensors 300 are arranged at or near the electronic display screen 200 and are configured to observe a spatial area in front of the electronic display screen 200 in order to detect a gesture input of a user.

18 Claims, 5 Drawing Sheets

CALIBRATION DEVICE AND METHOD FOR AN ELECTRONIC DISPLAY SCREEN FOR TOUCHLESS GESTURE CONTROL

This application claims priority to European Patent Office (EPO) application EP22167385 (filed Apr. 8, 2022) entitled "Calibration Device and Method for an Electronic Display Screen for Touchless Gesture Control," the entire disclosure of which is incorporated herein by reference.

TECHNICAL FIELD

The present invention generally relates to calibration techniques for touchless gesture control, and more particularly to a calibration device for use in a calibration process of an electronic display screen for touchless gesture control. Further, the present invention relates to a calibration method for an electronic display screen for touchless gesture control using a calibration device.

BACKGROUND

Electronic display devices have nowadays become omnipresent in various areas of modern life. Examples include electronic display screens in public places which provide useful information to the user, e. g. in shopping malls, trade shows, train stations, airports, and the like, a field which is commonly termed "digital signage". One form of such electronic display screens are touchscreens that provide interactive functions to allow users to interact with the information, e. g. by selecting control elements such as buttons, selecting items from a list, controlling a cursor, and the like. Such public touchscreens are nowadays used e. g. in ticketing machines, check-out systems in supermarkets or restaurants, interactive signposts, and the like.

However, not least because of the recent COVID-19 pandemic, users have become hesitant to use touchscreens in public places because of health concerns. This has created a desire to provide input capabilities, in particular gesture control, without having to physically touch the display. Some commercial products have already addressed this desire, for example:

- The touchless air gesture technology of Gestoos (https://gestoos.com/) aims at transforming touchscreens or digital displays into a touch-free experience. The Gestoos technology uses a depth sensor to allow the user to control the mouse cursor of the operating system, mapping the finger coordinates to its screen position, while the fingers stay at a distance from the screen.
- GLAMOS (https://www.kickstarter.com/projects/300948436/glamos-bring-your-touchless-screens-to-life), sets out to use lidar technology to turn screens into interactive touch screens.
- AIRxTOUCH (https://www.airxtouch.com/) provides an all-in-one touchless interactive kiosk. Depth sensors detect the user's finger before it touches the display and generates click events. The related international patent application WO 2015/139969 provides technological background.
- Touchjet (https://www.touchjet.com/wave-lily/) aims at turning flat screen TVs into a tablet for collaboration and interactive presentations using a digital pen.
- Ultraleap (https://developer.leapmotion.com/touchfree/) provides leapmotion, which is a small device (infraread camera) with relatively small range for hand tracking and hand gesture recognition. The system uses a single camera, so that the hand recognition precision is limited and decreases the bigger the screen is.

However, the known technologies either provide complete all-in-one hardware solutions to replace existing displays, provide only limited hand recognition precision or they require a cumbersome calibration of sensors that are added to an existing display to reliably detect gestures. What is needed is an easier way of retrofitting existing touchscreens or electronic display screens to provide touchless control capabilities that is easy to set up.

It is therefore the technical problem underlying the present invention to provide improved calibration means and techniques for calibrating an electronic display screen for touchless gesture control, thereby at least partly overcoming the disadvantages of the prior art.

SUMMARY

The problem is solved by the subject-matter defined in the independent claims. Advantageous modifications of embodiments of the invention are defined in the dependent claims as well as in the description and the figures.

According to a first aspect of the present invention, a calibration device for use in a calibration process of an electronic display screen for touchless gesture control is provided. The calibration device may comprise a main body defining a main axis of the calibration device, wherein the main axis may extend from a proximal end to a distal end of the main body. The calibration device may comprise a first foot at the distal end, the first foot preferably having a footing surface being placeable on the electronic display screen such that the footing surface is in contact with and parallel to the electronic display screen. The footing surface may be oriented at a predetermined angle, in particular 90°, with respect to the main axis of the calibration device. The calibration device may comprise a calibration pattern which may comprise a machine-readable code or pattern being detectable by one or more optical sensors, in particular one or more depth cameras. In is preferred that the one or more optical sensors are arranged at or near the display. The one or more optical sensors may be configured to observe a spatial area in front of the electronic display screen in order to detect a gesture input of a user.

A calibration device as described above is simple in design and easy to manufacture. Furthermore, it can be stowed in a space-saving manner. Furthermore, the handling of the device during calibration is particularly easy and convenient. Further, the quality of a calibration process may be enhanced by using the calibration device of the first aspect of the present invention.

The main body of the calibration device may for example have the shape of a cylinder, or may be in the shape of an ovoid, or may have the shape of an ellipsoid. The main axis may be defined as the central axis, in particular the central longitudinal axis of the main body.

At its proximal end, the main body may comprise a grip part which allows a user to easily and securely hold and handle the calibration device.

The proximal end may be an end that faces a user during use of the device for calibrating an electronic display screen for touchless gesture control. The distal end may be an end on the opposite side with respect to the proximal end of the main body and may in particular be an end that faces the electronic display screen during use of the device for calibrating an electronic display screen.

The footing surface of the first foot may be designed as a flat plate part. The flat plate part may have a plate area that prevents accidental tilting of the calibration device on the electronic display screen while a user places the calibration device on the electronic display screen in order to facilitate a high quality of calibration. In particular, the plate area may be greater than or equal to 1 cm$^2$.

Optionally, the footing surface may be of a material that will not damage the surface of an electronic display screen. Additionally or alternatively, the material may be selected to provide certain slip resistance on a surface of an electronic display screen to improve the handling of the calibration device. For example, the material may be a soft plastic, such as rubber.

Optionally, a reference marking may be provided at least at one portion of the footing surface to guide a user to a particular positioning of the calibration device on the electronic display screen. The reference marking may for example be provided at or near the edge of the footing surface. If the calibration device is used in a calibration process, the electronic display screen may display a calibration guiding mark on which the user may place the footing surface, wherein the guiding mark comprises a corresponding virtual reference marking that allows the user to position the footing surface correctly, in particular such that the reference marking and the virtual reference marking are at least partially overlapping. Providing a reference marking therefore supports the user to place the calibration device, if needed, in a predetermined position in the rotational direction around a normal of the electronic display screen. In other words, providing a reference marking will reduce the degrees of freedom in which the calibration device may be placed on the electronic display screen in an advantageous manner. The quality of a calibration process may therefore be enhanced.

In one particularly preferred embodiment, two reference markings may be provided at portions of the footing surface. For example, the reference markings may have at least one distinctive attribute such that the two reference markings are distinguishable by a user. For example, the two reference markings may differ in their color or shape. Analogous to the above-described virtual reference marking, in this case it may be provided that the electronic display screen displays two virtual reference markings, wherein a user can visually associate the two reference markings of the footing surface and the two virtual reference markings and place the calibration device accordingly on the electronic display screen. Providing more than one reference marking reduces the risk of positioning the calibration device deviating from an optimal position on the electronic display screen.

Alternatively or additionally, the footing surface may be at least partially transparent so that light from an electronic display screen can shine through the footing surface when the footing surface is placed on the electronic display screen. This can further increase positioning accuracy and usability of the calibration device.

The calibration pattern of the calibration device may be any type of machine-readable code or pattern, preferably including at least one fiducial marker. Examples for a suitable calibration pattern are AprilTags and/or QR-Codes, and/or three-dimensional patterns, e.g. having a spherical shape.

The optical sensors of the electronic screen device may be placed at or near an upper edge of the electronic display screen and/or at or near a lower edge of the electronic display screen. For example, the optical sensors may be depth cameras, in particular Intel RealSense depth cameras.

It may be provided that the calibration device comprises signaling means configured for signaling, preferably without a further user input, that the calibration device is in a calibration position. The signaling means may be configured for providing a visual marking upon contact of the calibration device with the electronic display screen, the visual marking being detectable by the one or more optical sensors. Optionally, the signaling means comprises a mechanical and/or electronical signaling mechanism configured for revealing the visual marking upon contact of the calibration device with the electronic display screen.

The visual marking may be detected by the optical sensors for triggering a calibration process of the electronic display screen. In other words, a calibration process may be configured to start automatically upon detection of the visual marking. Therefore, by providing the visual marking, an additional user input and/or triggering signal is not necessary and a calibration process may be triggered automatically based on the detection of the visual marking.

A signaling means comprising an electronical signaling mechanism may e. g. comprise a Light Emitting Diode (LED) which gets activated upon contact of the calibration device with the electronic display screen. In that sense, the LED may be a visual marking according to the above description.

One example for a signaling means comprising a mechanical signaling mechanism is described in detail below.

The calibration device may further comprise the following features: At least a portion of the main body may be designed as a sleeve providing a receiving space along the main axis. In the receiving space, a spring may be arranged which may be in physical contact with a bearing part of the main body and may be elastically deformed by a rod. The rod may at least partially be retained in the receiving space and slidably guided along the main axis, wherein the rod may be displaceable relative to the main body into a first and a second position. In the first position of the rod, the spring may be essentially non-deformed and the rod may protrude out of the main body at the distal end.

In the second position of the rod, it may be provided that the spring is elastically deformed and a visual marking of the rod is aligned with a recess of the main body so that the visual marking becomes visible through the recess. This may be one example of a mechanical signaling mechanism in the sense of what is described above.

Alternatively or additionally, it may be provided that an electronic visual marking starts to emit an electromagnetic signal preferably being a light signal. This may be an embodiment in conjunction with an electronical signaling means in the sense of what is describes above.

It may be provided that the spring of the calibration device is a compression spring and is arranged at the proximal end of the main body in the receiving space.

Using a compression spring is a particularly easy way of designing the calibration device comprising the sliding rod. Preferably, the compression spring is made of metal or rubber material. If the compression spring is made of metal, it may for example be a coil spring or a Belleville spring or a disc spring.

It may be provided that the rod builds the first foot, or the first foot is mounted at the rod. This particular embodiment has an advantageous compact design and yet has broad functionality for calibrating an electronic display screen.

It may be provided that the rod builds the first foot, or the first foot is mounted at the rod. This embodiment is particularly space-saving and at the same time easy to handle.

It may be provided that the calibration device comprises a second foot at the distal end, the second foot having a footing surface being placeable on the electronic display screen such that the footing surface is in contact with and parallel to the electronic display screen, wherein the footing surface is oriented at the predetermined angle with respect to the main axis of the calibration device.

Providing a second foot reduces the degrees of freedom in which the calibration device may be placed on the electronic display screen in an advantageous manner. Therefore, the risk of positioning the calibration device deviating from an optimal position on the electronic display screen is reduced.

Further, it may be provided that the calibration device comprises a third foot at the distal end, the third foot having a footing surface being placeable on the electronic display screen such that the footing surface is in contact with and parallel to the electronic display screen, wherein the footing surface is oriented at the predetermined angle with respect to the main axis of the calibration device.

Providing a third foot prevents the calibration device from tilting on the electronic display screen while a user places the calibration device on the electronic display screen. It reduces the degrees of freedom in which the calibration device may be placed on the electronic display screen in an advantageous manner. Therefore, the risk of positioning the calibration device deviating from an optimal position on the electronic display screen is reduced.

The footing surface of the second foot and/or third foot may be designed as a flat plate part. The flat plate part may have a plate area that prevents accidental tilting of the calibration device on the electronic display screen while a user places the calibration device on the electronic display screen in order to facilitate a high quality of calibration. In particular, the plate area may be greater than or equal to 1 $cm^2$.

Optionally, a reference marking may be provided at least at one portion of the footing surface of the first foot and/or second foot to guide a user to a particular positioning of the calibration device on the electronic display screen. The reference marking may for example be provided at or near the edge of the footing surface. If the calibration device is used in a calibration process, the electronic display screen may display a calibration guiding mark on which the user may place the footing surface, wherein the guiding mark comprises a corresponding virtual reference marking that allows the user to position the footing surface correctly, in particular such that the reference marking and the virtual reference marking are at least partially overlapping. Providing a reference marking therefore supports the user to place the calibration device, if needed, in a predetermined position.

It may be provided that each footing surface fall into one common plane when the calibration device is placed on the electronic display screen. This further facilitates that the calibration device can be places in a correct and stable manner on the electronic display screen. The quality of a calibration process may therefore be enhanced.

It may be provided that the calibration pattern is a fiducial marker, preferably an AprilTag and/or a QR-Code, and/or a three-dimensional pattern, preferably having a spherical shape.

According to a second aspect of the present invention, a computer-implemented method of calibrating an electronic display screen for touchless gesture control using a calibration device is provided. The used calibration device may be a calibration device according to the first aspect of the present invention. The method may comprise displaying, preferably in or near the center of the electronic display screen, a first calibration guiding mark on the electronic display screen for guiding a user to place the calibration device in an aligned position and/or in an aligned orientation on the electronic display screen. The method may further comprise detecting a calibration pattern of the calibration device in a calibration position using one or more optical sensors, in particular one or more depth cameras. The method may further comprise determining a touchless gesture control input area for the electronic display screen based on the detected calibration pattern.

All technical implementation details and advantages described with respect to the first aspect of the present invention are self-evidently mutatis mutandis applicable for the second aspect of the present invention.

The term electronic display screen can include any type of display that is powered by electrical energy. In particular, it includes all types of LCD screens, LED screens, touch screens, e-ink screens and the like. The size and shape of the screens may vary.

The term touchless gesture control encompasses the control of content, control elements, display elements, information offers and setting parameters through user gestures. In particular, it includes any kind of interaction of a user with the electronic display screen that is based on movements of a user's extremities, in particular a user's arm, hand or finger(s). Examples of such movement include, in particular, click movements and swipe movements that can be performed with the hand and/or fingers of a user. As another example, handshape-based gestures may be included, particularly the clenching of a fist or the spreading of fingers.

The at least one depth camera may be placed at or near an upper edge of the electronic display screen and/or at or near a lower edge of the electronic display screen. For example, if the electronic display screen comprises a framing, the at least one depth camera may be mounted at this framing. The at least one depth camera may for example be an Intel RealSense depth camera.

In general, the calibration according to the first aspect of the present invention may be performed locally on the electronic display screen, for example using a processor of the electronic display screen, or may be performed remotely on a server with which the electronic display screen may communicate, preferably at runtime. The server may be a cloud-based calibration platform.

The term calibration position may include a predetermined position of the calibration device when placed on the electronic display screen and preferably also the orientation of the calibration device as described above. Further details are disclosed below.

The term orientation may include, in particular, a rotation of the calibration device about a plane-normal of the electronic display screen. Further, the term orientation may include a tilting of the calibration device with respect to the plane-normal of the electronic display screen.

The term input area of the electronic display screen refers in general to the screen layer of the electronic display screen on which content may be displayed during an interaction of a user and with which a user may interact. For enabling gesture input, the input area may include or be equal to a virtual screen layer which is defined to extend distanced by a predetermined distance parallel to the electronic display screen. In other words, the input area may be a spatial area which is e.g. parallel to the screen layer and which is observed by the at least one depth camera to recognize gesture inputs of users. Thus, it may be provided that determining a touchless gesture control input area comprises a definition of a virtual screen layer being essentially parallel to the electronic display screen, preferably at a distance d and/or a definition of the dimensions of the electronic display screen and/or a definition of a coordinate system, preferably a cartesian coordinate system with an x-axis and a y-axis, each being parallel to the electronic display screen, and a z-axis being orthogonal to the electronic display screen.

The method may further comprise the definition of setup-parameters associated with the input area. Preferably, the setup-parameters include the definition of the input area. Further, the setup-parameters may include predefined gestures, gesture velocities and/or other parameters associated with the functionality of the electronic display screen with respect to user interaction. It is particularly preferred if the setup-parameters include a tolerance range with respect to the input area which allows to compensate slight calibration inaccuracies, so that the user experience during user interaction is not adversely affected.

The proposed method according to the present invention is particularly advantageous as it allows simple and at the same time precise calibration of electronic display screens of any kind. In particular, only a few steps are required since the calibration device only has to be placed once. Thus, the calibration can be completed in a short time. It is beneficially possible to equip also already existing electronic display screens, for example with touchscreens or non-touchscreens, which may have been in use for years, with a gesture control option. For example, depth cameras can be mounted on an existing electronic display screen and the corresponding software can be executed for calibration.

Using at least one calibration guiding mark provides an easy and efficient support for a user calibrating an electronic display screen. Further, the quality of a calibration process may be enhanced by providing at least one calibration guiding mark. In other words: Using at least one calibration guiding mark makes it easy to find an aligned position and/or in an aligned orientation of a calibration device on the electronic display screen, thus increasing the risk of a wrong calibration.

It may be provided that the method comprises a plurality of calibration modes that may be determined prior to running the calibration process by user input, in particular by user selection. It is particularly advantageous if the calibration modes are associated with a type of calibration device intended to be used for calibration. Different types of calibration devices may be calibration devices with different number of feet, or having a rod or not, as described above with respect to the first aspect of the present invention.

For example, if the calibration device has a first and a second foot, the respective calibration mode may be chosen by a user. During calibration, the electronic display screen may accordingly display two calibration guiding marks, one for the first foot and one for the second foot.

It may be provided that in the step of displaying, a second calibration guiding mark and preferably a third calibration guiding mark is displayed on the electronic display screen, wherein the calibration guiding marks may have different colors and/or shapes. As described above, the number of displayed calibration guiding marks may depend on the type of calibration device which is used.

By using different colors of the calibration guiding marks, the degrees of freedom in which the calibration device may be placed on the electronic display screen is reduced in an advantageous manner. Therefore, the risk of positioning the calibration device deviating from an optimal position on the electronic display screen is reduced. Providing more than one calibration guiding mark in conjunction with a calibration device having more than one foot, in particular supports the user to place the calibration device, if needed, in a predetermined position in the rotational direction around a normal of the electronic display screen.

Alternatively or additionally, the electronic display screen may provide at least one virtual reference marking at the at least one calibration guiding mark. This may guide a user to a particular positioning of a calibration device on the electronic display screen. The virtual reference marking may for example be provided at or near the edge of the respectively displayed calibration guiding mark. If the used calibration device has a corresponding reference marking on its foot surface(s), the user is supported to position calibration device correctly, in particular such that the respective reference marking and the respective virtual reference marking are at least partially overlapping. This supports the user to place the calibration device, if needed, in a predetermined position in the rotational direction around a normal of the electronic display screen. In other words, providing a virtual reference marking will reduce the degrees of freedom in which the calibration device may be placed on the electronic display screen in an advantageous manner. The quality of a calibration process may therefore be enhanced.

In one particularly preferred embodiment, two reference markings may be provided at portions of the footing surface. For example, the reference markings may have at least one distinctive attribute such that the two reference markings are distinguishable by a user. For example, the two reference markings may differ in their color or shape. Analogous to the above-described virtual reference marking, in this case it may be provided that the electronic display screen displays two virtual reference markings, wherein a user can visually associate the two reference markings of the footing surface and the two virtual reference markings and place the calibration device accordingly on the electronic display screen. Providing more than one reference marking reduces the risk of positioning the calibration device deviating from an optimal position on the electronic display screen.

The method may comprise a step of triggering a calibration process upon detecting of a visual marking of a rod of the calibration device, and/or upon detection of an electromagnetic signal, and/or upon receiving user input after the calibration device has been placed on the electronic display screen. With respect to the technical implementation and benefits of this particular feature, it is referred to the description of the first aspect of the present invention.

It may be provided that determining a touchless gesture control input area comprises a definition of a virtual screen layer being essentially parallel to the electronic display screen and/or a definition of the dimensions of the electronic display screen and/or a definition of a coordinate system, preferably a cartesian coordinate system with an x-axis and a y-axis, each being parallel to the electronic display screen, and a z-axis being orthogonal to the electronic display screen.

According to a third aspect of the present invention, it is provided data processing apparatus comprising means for carrying out a method according to the second aspect of the present invention.

According to a fourth aspect of the present invention, a kit-of-parts is provided, comprising a calibration device according to the first aspect of the present invention, and at least one depth camera for carrying out a calibration method according to the second aspect of the present invention.

According to a fifth aspect of the present invention, a computer program is provided comprising instructions which, when the program is executed by a computer, cause the computer to carry out a method according to the second aspect of the present invention.

All technical implementation details and advantages described with respect to the first and second aspects of the present invention, are self-evidently mutatis mutandis applicable for the third, fourth and fifth aspects of the present invention.

BRIEF DESCRIPTION OF THE DRAWINGS

The disclosure may be better understood by reference to the following drawings.

DESCRIPTION OF PREFERRED EMBODIMENTS

Figure 1:
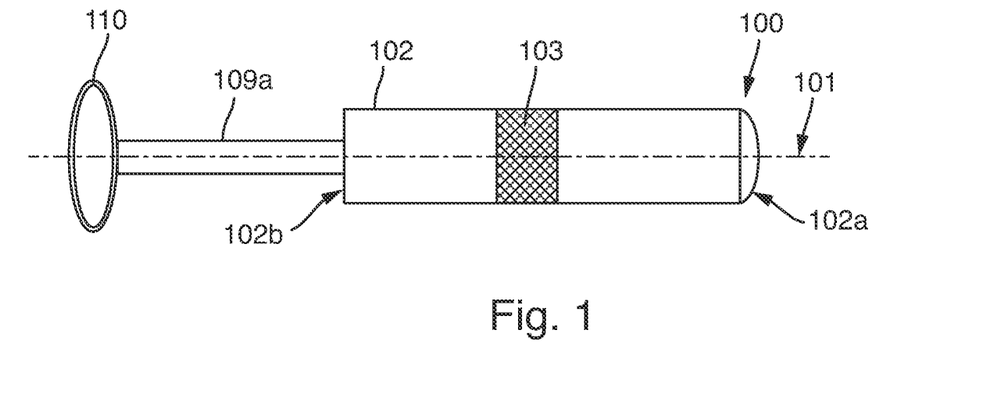
FIG. 1: A first schematic illustration of a calibration device in accordance with embodiments of the invention.

In FIG. 1, a first schematic illustration of a calibration device 100 in accordance with embodiments of the invention is shown. The calibration device 100 comprises a main body 102 along which a main axis 101 is defined. The main body 102 has a proximal end 102a and a distal end 102b. Further, the calibration device 100 comprises a calibration pattern 103 which is schematically illustrated to be on the main body 102. Further, the calibration device comprises a first foot 109a having a footing surface 110.

Figure 2:
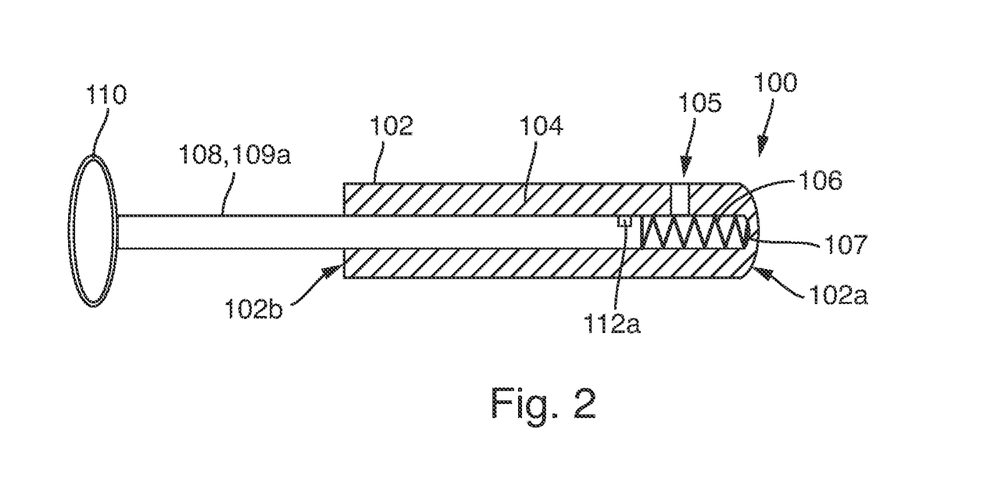
FIG. 2: A schematic longitudinal sectional view of a calibration device in accordance with embodiments of the invention.

FIG. 2 is a schematic longitudinal sectional view of a calibration device 100 in accordance with embodiments of the invention. The calibration device 100 comprises a main body 102 having a proximal end 102a and a distal end 102a as described above with respect to FIG. 1. Further, the main body 102 is designed to be a sleeve which provides a receiving space 104. In the receiving space 104, a compression spring 106 is arranged to be in contact with a bearing part 107 at one end, and to be in contact with a rod 108 at the other end. The compression spring 106 may be elastically deformed by movement of the rod 108 relative to the main body 102.

The rod 108 is slidably guided inside the receiving space 104 in such manner that it protrudes out of the main body 102 at its distal end 102b. In the embodiment of FIG. 2, the rod 108 at the same time builds the first foot 109a and comprises a footing surface 110 as describes above.

The rod comprises a visual marking 112a having a distinctive color. The visual marking 112a may become visible through a recess 105 of the main body 102 upon movement of the rod 108 in the receiving space 104 towards the proximal end 102a.

Figure 3:
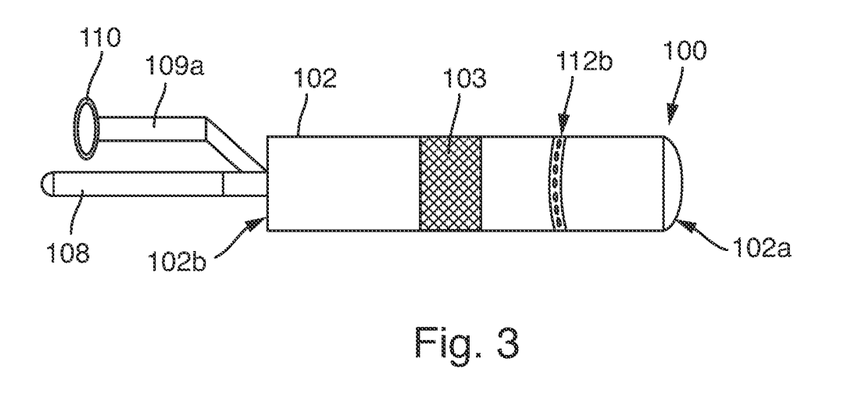
FIG. 3: A second schematic illustration of a calibration device in accordance with embodiments of the invention.

In FIG. 3, a second schematic illustration of a calibration device 100 in accordance with embodiments of the invention is shown. In this embodiment, the main body 102 comprises, apart from the calibration pattern 103, a electronic visual marking 112b. The electronic visual marking may be a arrangement of light emitting diodes (LEDs). The calibration device 100 further comprises a rod 108 and a first foot 109a having a footing surface 110. If the calibration device 100 of FIG. 3 is placed on an electronic display screen, the rod 108 slides into the receiving space 104, as described with respect to FIG. 2, and the tip of the rod 108 gets in one plane with the footing surface 110 of the first foot 109a. The calibration device 100 may be configured such that, when the rod 108 gets in one plane with the footing surface 110, the electronic visual marking 112b gets activated.

Figure 4:
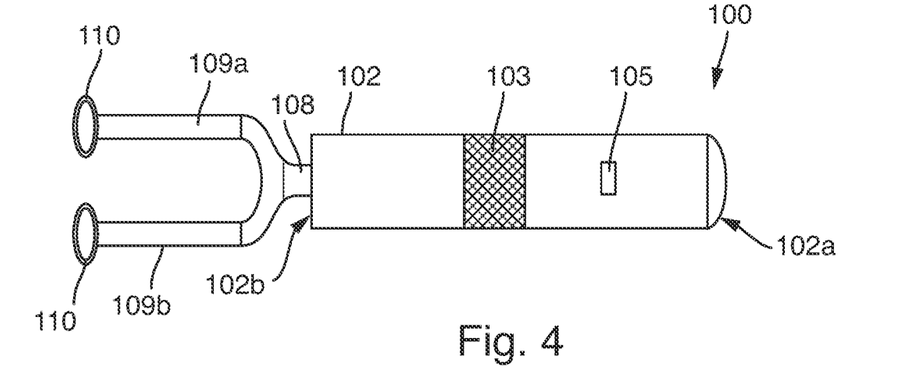
FIG. 4: A third schematic illustration of a calibration device in accordance with embodiments of the invention.
Figure 5A:
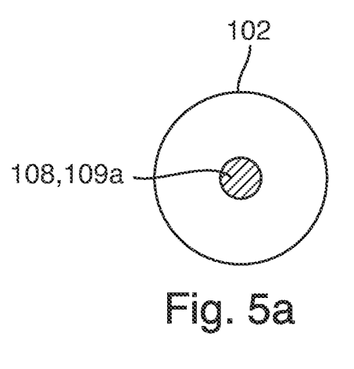
FIG. 5a: A first schematic cross-sectional view of the distal end of a calibration device in accordance with embodiments of the invention.
Figure 5B:
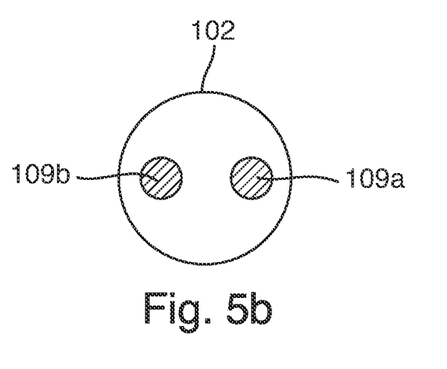
FIG. 5b: A second schematic cross-sectional view of the distal end of a calibration device in accordance with embodiments of the invention.
Figure 5C:
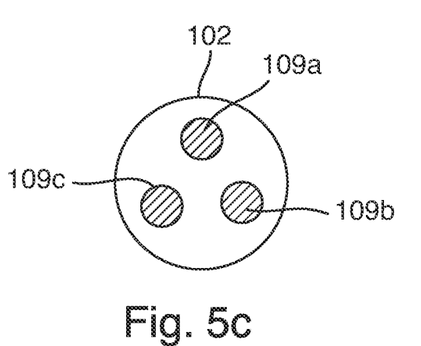
FIG. 5c: A third schematic cross-sectional view of the distal end of a calibration device in accordance with embodiments of the invention.
Figure 5D:
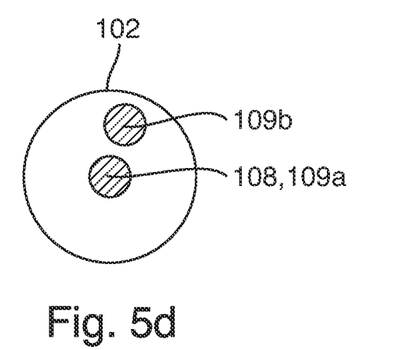
FIG. 5d: A fourth schematic cross-sectional view of the distal end of a calibration device in accordance with embodiments of the invention.

In FIG. 4, a third schematic illustration of a calibration device 100 in accordance with embodiments of the invention is shown. As can be seen from the figure, the main body 102 comprises a recess 105 such that a visual marker 112a of the rod 108 may become visible through it if the rod 108 is moved towards the proximal end 102a.

The calibration device 100 of this embodiment has a rod 108 on which a first foot 109a and a second foot 109b are mounted. Each, the first foot 109a and the second foot 109b have a footing surface 110.

It can of course be easily understood that a simplification of this embodiment is possible in that the rod 108 is not provided, and the first foot 109a and the second foot 109b are fixedly provided at the main body 102.

FIGS. 5a to 5d each show a schematic cross-sectional view of the distal end 102b of a calibration device 100 in accordance with embodiments of the invention. The cross-section is made through the rod 108 and/or the feet 109a, 109b, 109c respectively. The calibration device 100 of FIG. 5a comprises one single first foot 109a which may optionally be build as a rod 108 as described above. The calibration device 100 of FIG. 5b comprises a first foot 102a and a second foot 109b. Optionally, the feet 109a, 109b may be built as a rod 108 and/or be mounted at a rod 108, as described above. The calibration device 100 of FIG. 5c comprises a first foot 109a, a second foot 109b and a third foot 109c. Optionally, the feet 109a, 109b may be built as a rod 108 and/or be mounted at a rod 108, as described above. The calibration device 100 of FIG. 5d comprises a first foot 109a being a rod 108, and a second foot 109b.

Figure 6:
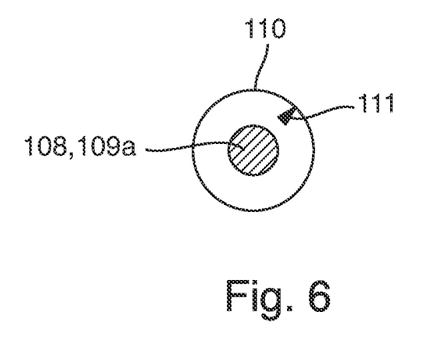
FIG. 6: A schematic cross-sectional view of the proximal end of a calibration device in accordance with embodiments of the invention.

FIG. 6 provides a schematic cross-sectional view of the proximal end 102a of a calibration device 100 having a first foot 109a being a rod 108 and having a footing surface 110. The cross-section is made through the rod 108, i. e. through the first foot 109a. The footing surface 110, as it can be seen in FIG. 6, comprises a reference marking 111 for guiding a user to place the calibration device 100 in a specific orientation on an electronic display screen 200.

Figure 7:
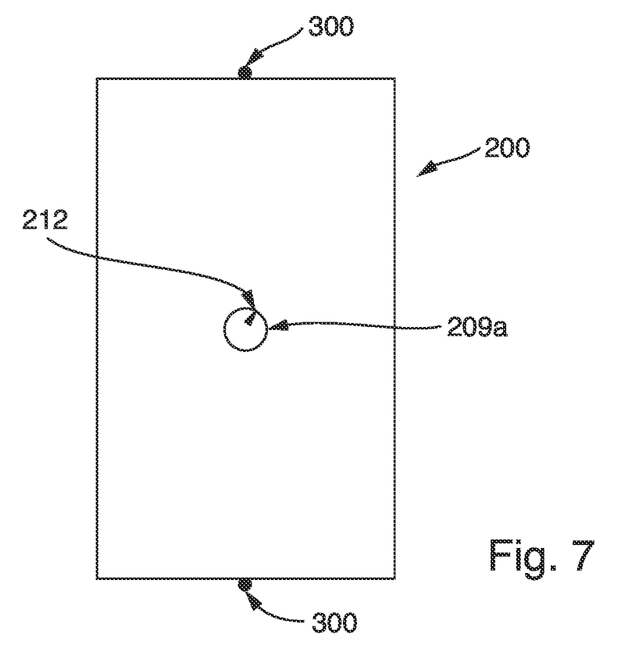
FIG. 7: A first schematic illustration of an electronic display screen which may be used in a calibration method in accordance with embodiments of the invention.

FIG. 7 shows a first schematic illustration of an electronic display screen 200 which may be used in a calibration method in accordance with embodiments of the invention. The electronic display screen 200 comprises optical sensors 300 at its top and bottom edges respectively. Further, the electronic display screen 200 shows a first calibration guiding mark 209a for placing a calibration device 100 on it, as described above. The calibration guiding mark 209a comprises a virtual reference marking 212 for providing further guidance to a user who intends to calibrate the electronic display screen 200 by means of a calibration device 100 having a reference marking 112 as described above.

Figure 8:
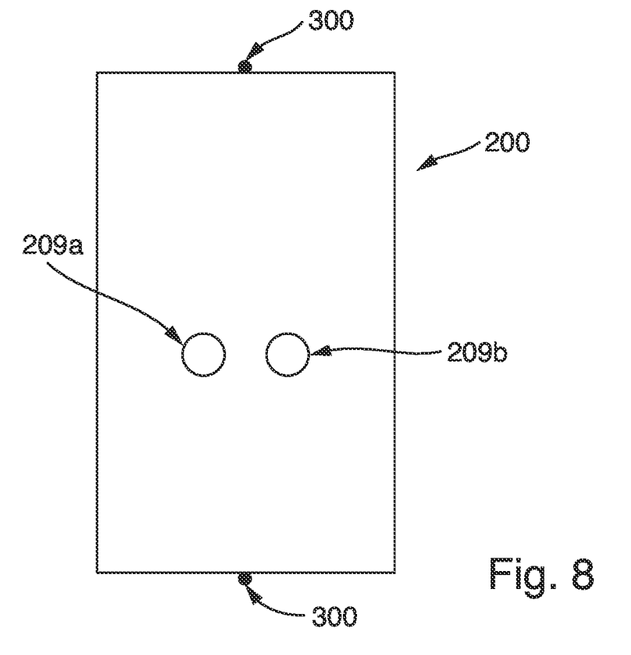
FIG. 8: A second schematic illustration of an electronic display screen which may be used in a calibration method in accordance with embodiments of the invention.

FIG. 8 shows a second schematic illustration of an electronic display screen 200 which may be used in a calibration method in accordance with embodiments of the invention. The electronic display screen 200 shows a first calibration guiding mark 209a and a second calibration guiding mark 209b for placing a calibration device 100 on it, i. e. a footing surface 110 of a first foot 109a and a footing surface 110 of a second foot 109b, respectively.

Figure 9:
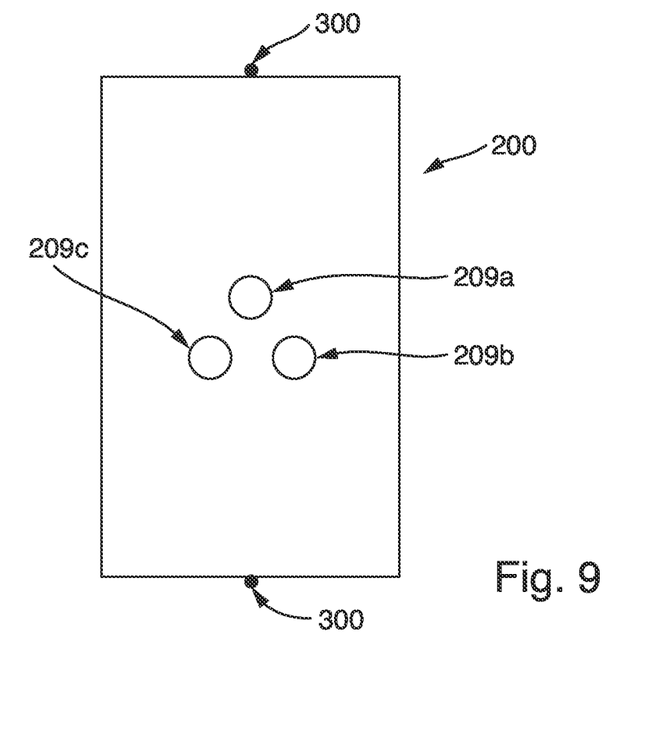
FIG. 9: A third schematic illustration of an electronic display screen which may be used in a calibration method in accordance with embodiments of the invention.

FIG. 9 shows a third schematic illustration of an electronic display screen 200 which may be used in a calibration method in accordance with embodiments of the invention. The electronic display screen 200 shows a first calibration guiding mark 209a, a second calibration guiding mark 209b and a third calibration guiding mark 209c for placing a calibration device 100 on it, i. e. a footing surface 110 of a first foot 109a and a footing surface 110 of a second foot 109b and a footing surface 110 of a third foot 109c, respectively.

In the following, one exemplary embodiment of the calibration method according to the present invention is described in different words. The person skilled in the art may understand and associate this wording in the context of the description above:

a) guiding the user where to put the calibration device by showing a calibration guiding mark being a spot in the center of the screen
aa) showing not only one single spot but 2-3 guiding marks or one with a reference marker to preserve the angle be straight
b) the user aligns the calibration device with the guiding mark on the screen
ba) after that, the user presses a button or any key to signal the calibration module that the thing is ready to be calibrated
bb) or auto detect that the calibration device is placed by analyzing another small AprilTag which triggers calibration and which is shown only when the stick is placed on the screen
c) detecting the center of the calibration pattern of the calibration device in 3D and the rotation of it in 3D
ca) by already knowing the shape of the calibration pattern, the center and the corners of the calibration pattern can be found in 2D, for example an RGB or Infrared module of the depth camera
cb) after that we need to transform 2D knowledge to 3D trough the other modules of the depth camera (adding depth information). To do that, we use the fact that Intel RealSense depth cameras which have two infrared sensors. The image disparity (difference in pixels of two particular images) is used to calculate the depth. So it is possible to get the depth of the center and the corners of the calibration pattern, and thus the 3D position of the calibration pattern.
cc) after that, the angle of the calibration device may be calculated based on the 3D corner points of the calibration pattern
cd) based on that, it is possible to figure out the relative positions and rotations of the depth camera
ce) at this stage, the cameras positions in the marker coordinate space are known but after that we will transform camera positions to the screen coordinate space
d) what is missing are the screen corners because all the other parts of calibration are already known at this stage
da) to find the corners of the screen we need to know the screen width and height in cm or inch
db) and just by adding the respective half of the width and the height to the center we know the corners
dc) how to know the physical width and height of the screen? We can ask a user or take it from the system (in Windows OS we can take resolution multiplied by pixel density)

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The below Reference Signs are provided herein by way of non-limiting example.

REFERENCE SIGNS 100 calibration device
101 main axis
102 main body
102a proximal end
102b distal end
103 calibration pattern
104 receiving space
105 recess
106 spring
107 bearing part
108 rod
109a first foot
109b second foot
109c third foot
110 footing surface
111 reference marking
112a visual marking
112b electronic visual marking
200 electronic display screen
209a first calibration guiding mark
209b second calibration guiding mark
209c third calibration guiding mark
212 virtual reference marking
300 optical sensors

ASPECTS OF THE PRESENT DISCLOSURE

The following aspects of the disclosure are exemplary only and not intended to limit the scope of the disclosure.

1. A calibration device (100) for use in a calibration process of an electronic display screen (200) for touchless gesture control, the calibration device (100) comprising:

a main body (102) defining a main axis (101) of the calibration device (100), wherein the main axis (101) extends from a proximal end (102a) to a distal end (102b) of the main body (102);

a first foot (109a) at the distal end (102b), the first foot (109a) having a footing surface (110) being placeable on the electronic display screen (200) such that the footing surface (110) is in contact with and parallel to the electronic display screen (200), wherein the footing surface (110) is oriented at a predetermined angle, in particular 90°, with respect to the main axis (101) of the calibration device (100);

a calibration pattern (103) comprising a machine-readable code being detectable by one or more optical sensors (300), in particular one or more depth cameras, wherein the one or more optical sensors (300) are arranged at or near the electronic display screen (200) and are configured to observe a spatial area in front of the electronic display screen (200) in order to detect a gesture input of a user.

2. The calibration device (100) of aspect 1, wherein
   the calibration device (100) comprises signaling means configured for signaling, preferably without a further user input, that the calibration device (100) is in a calibration position, wherein preferably
   the signaling means is configured for providing a visual marking (112a, 112b) upon contact of the calibration device (100) with the electronic display screen (200), the visual marking (112a, 112b) being detectable by the one or more optical sensors (300), and wherein preferably
   the signaling means comprises a mechanical and/or electronical signaling mechanism configured for revealing the visual marking (112a, 112b) upon contact of the calibration device (100) with the electronic display screen (200).

3. The calibration device (100) of aspect 1 or 2,
   wherein at least a portion of the main body (102) is designed as a sleeve providing a receiving space (104) along the main axis (101),
   wherein in the receiving space (104), a spring (106) is arranged which is in physical contact with a bearing part (107) of the main body (102) and may be elastically deformed by a rod (108),
   wherein the rod (108) is at least partially retained in the receiving space (104) and slidably guided along the main axis (101), the rod (108) being displaceable relative to the main body (102) into a first and a second position,
   wherein in the first position, the spring (106) is essentially non-deformed and the rod (108) protrudes out of the main body (102) at the distal end (102b).

4. The calibration device (100) of aspect 3, wherein in the second position, the spring (106) is elastically deformed, and
   a visual marking (112a) of the rod (108) is aligned with a recess (105) of the main body (102) so that the visual marking (112a) becomes visible through the recess (105), and/or
   an electronic visual marking (112b) starts to emit an electromagnetic signal preferably being a light signal.

5. The calibration device (100) of one of aspects 3 to 4, wherein the spring (106) is a compression spring and is arranged at the proximal end (102a) of the main body (102) in the receiving space (104).

6. The calibration device (100) of one of aspects 3 to 5, wherein the rod (108) builds the first foot (109a), or the first foot (109a) is mounted at the rod (108).
7. The calibration device (100) of one of aspects 1 to 6, comprising a second foot (109b) at the distal end (102b), the second foot (109b) having a footing surface (110) being placeable on the electronic display screen (200) such that the footing surface (110) is in contact with and parallel to the electronic display screen (200), wherein the footing surface (110) is oriented at the predetermined angle with respect to the main axis (101) of the calibration device (100).
8. The calibration device (100) of aspect 7, comprising a third foot (109c) at the distal end (102b), the third foot (109c) having a footing surface (110) being placeable on the electronic display screen (200) such that the footing surface (110) is in contact with and parallel to the electronic display screen (200), wherein the footing surface (110) is oriented at the predetermined angle with respect to the main axis (101) of the calibration device (100).
9. The calibration device (100) of one of aspects 1 to 8, wherein the calibration pattern (103) is a fiducial marker, preferably an AprilTag and/or a QR-Code, and/or a three-dimensional pattern, preferably having a spherical shape.
10. A computer-implemented method of calibrating an electronic display screen (200) for touchless gesture control using a calibration device (100), preferably according to one of aspects 1-9, wherein the method comprises:
    displaying, preferably in or near the center of the electronic display screen (200), a first calibration guiding mark (209a) on the electronic display screen (200) for guiding a user to place the calibration device (100) in an aligned position and/or in an aligned orientation on the electronic display screen (200);
    detecting a calibration pattern (103) of the calibration device (100) in a calibration position using one or more optical sensors (300), in particular one or more depth cameras;
    determining a touchless gesture control input area for the electronic display screen (200) based on the detected calibration pattern (103).
11. The computer-implemented method of aspect 10, wherein in the step of displaying, a second calibration guiding mark (209b) and preferably a third calibration guiding mark (209c) is displayed on the electronic display screen (200), wherein the calibration guiding marks (209a, 209b, 209c) may have different colors and/or shapes.
12. The computer-implemented method of one of aspects 10 to 11, comprising triggering a calibration process upon detecting of a visual marking of a rod (108) of the calibration device (100), and/or upon detection of an electromagnetic signal, and/or upon receiving user input after the calibration device (100) has been placed on the electronic display screen (200).
13. The computer-implemented method of one of aspects 10 to 12, wherein determining a touchless gesture control input area comprises a definition of a virtual screen layer being essentially parallel to the electronic display screen (200) and/or a definition of the dimensions of the electronic display screen (200) and/or a definition of a coordinate system, preferably a cartesian coordinate system with an x-axis and a y-axis, each being parallel to the electronic display screen (200), and a z-axis being orthogonal to the electronic display screen (200).
14. A data processing apparatus comprising means for carrying out the method of any one of aspects 10 to 13.
15. A computer program comprising instructions which, when the program is executed by a computer, cause the computer to carry out the method of any one of aspects 10 to 13.

The invention claimed is:

1. A calibration device for use in a calibration process of an electronic display screen for touchless gesture control, the calibration device comprising:
    a main body defining a main axis of the calibration device, wherein the main axis extends from a proximal end to a distal end of the main body;
    a first foot at the distal end, the first foot having a footing surface being placeable on the electronic display screen such that the footing surface is in contact with and parallel to the electronic display screen, wherein the footing surface is oriented at a predetermined angle with respect to the main axis of the calibration device; and
    a calibration pattern comprising a machine-readable code being detectable by one or more optical sensors, wherein the one or more optical sensors are arranged at or near the electronic display screen and are configured to observe a spatial area in front of the electronic display screen in order to detect a gesture input of a user,
    wherein at least a portion of the main body is designed as a sleeve providing a receiving space along the main axis,
    wherein in the receiving space, a spring is arranged which is in physical contact with a bearing part of the main body and may be elastically deformed by a rod,
    wherein the rod is at least partially retained in the receiving space and slidably guided along the main axis, the rod being displaceable relative to the main body into a first and a second position,
    wherein in the first position, the spring is essentially non-deformed and the rod protrudes out of the main body at the distal end.

2. The calibration device of claim 1, wherein
    the calibration device comprises signaling means configured for signaling, that the calibration device is in a calibration position, wherein:
    the signaling means is configured for providing a visual marking upon contact of the calibration device with the electronic display screen, the visual marking being detectable by the one or more optical sensors, and wherein:
    the signaling means comprises a mechanical and/or electronical signaling mechanism configured for revealing the visual marking upon contact of the calibration device with the electronic display screen.

3. The calibration device of claim 2, wherein the one or more optical sensors comprise one or more depth cameras.

4. The calibration device of claim 1, wherein in the second position, the spring is elastically deformed, and
    a visual marking of the rod is aligned with a recess of the main body so that the visual marking becomes visible through the recess, and/or
    an electronic visual marking starts to emit an electromagnetic signal.

5. The calibration device of claim 4, wherein the electromagnetic signal is a light signal.

6. The calibration device of claim 1, wherein the spring is a compression spring and is arranged at the proximal end of the main body in the receiving space.

7. The calibration device of claim 1, wherein the rod builds the first foot, or the first foot is mounted at the rod.

8. The calibration device of claim 1, comprising a second foot at the distal end, the second foot having a footing surface being placeable on the electronic display screen such that the footing surface is in contact with and parallel to the electronic display screen, wherein the footing surface is oriented at the predetermined angle with respect to the main axis of the calibration device.

9. The calibration device of claim 8, comprising a third foot at the distal end, the third foot having a footing surface being placeable on the electronic display screen such that the footing surface is in contact with and parallel to the electronic display screen, wherein the footing surface is oriented at the predetermined angle with respect to the main axis of the calibration device.

10. The calibration device of claim 1, wherein the calibration pattern is a fiducial marker and/or a three-dimensional pattern.

11. The calibration device of claim 10, wherein the fiducial marker is an AprilTag and/or a QR code, and wherein the three-dimensional pattern has a spherical shape.

12. A computer-implemented method of calibrating an electronic display screen for touchless gesture control using a calibration device, the computer-implemented method comprising:
   displaying a first calibration guiding mark on the electronic display screen for guiding a user to place the calibration device in an aligned position and/or in an aligned orientation on the electronic display screen;
   detecting a calibration pattern of the calibration device in a calibration position using one or more optical sensors; and
   determining a touchless gesture control input area for the electronic display screen based on the detected calibration pattern,
   wherein in the step of displaying, a second calibration guiding mark is displayed on the electronic display screen, wherein the calibration guiding marks may have different colors and/or shapes.

13. The computer-implemented method of claim 12, wherein the first calibration guiding mark is displayed in or near a center of the electronic display screen.

14. The computer-implemented method of claim 10, wherein in the step of displaying, a third calibration guiding mark is displayed on the electronic display screen, the third calibration guiding mark having a different color and/or shape compared to the first calibration guiding mark and the third calibration guiding mark.

15. A tangible, non-transitory computer-readable medium storing instructions for calibrating an electronic display screen for touchless gesture control using a calibration device, the computing instructions when executed by a computing device, cause the computing device to:
   display a first calibration guiding mark on the electronic display screen for guiding a user to place the calibration device in an aligned position and/or in an aligned orientation on the electronic display screen;
   detect a calibration pattern of the calibration device in a calibration position using one or more optical sensors;
   determine a touchless gesture control input area for the electronic display screen based on the detected calibration pattern; and
   trigger a calibration process upon detecting of a visual marking of a rod of the calibration device, and/or upon detection of an electromagnetic signal, and/or upon receiving user input after the calibration device has been placed on the electronic display screen.

16. A computer-implemented method of calibrating an electronic display screen for touchless gesture control using a calibration device, the computer-implemented method comprising:
   displaying a first calibration guiding mark on the electronic display screen for guiding a user to place the calibration device in an aligned position and/or in an aligned orientation on the electronic display screen;
   detecting a calibration pattern of the calibration device in a calibration position using one or more optical sensors;
   determining a touchless gesture control input area for the electronic display screen based on the detected calibration pattern; and
   triggering a calibration process upon detecting of a visual marking of a rod of the calibration device, and/or upon detection of an electromagnetic signal, and/or upon receiving user input after the calibration device has been placed on the electronic display screen.

17. A computer-implemented method of calibrating an electronic display screen for touchless gesture control using a calibration device, the computer-implemented method comprising:
   displaying a first calibration guiding mark on the electronic display screen for guiding a user to place the calibration device in an aligned position and/or in an aligned orientation on the electronic display screen;
   detecting a calibration pattern of the calibration device in a calibration position using one or more optical sensors; and
   determining a touchless gesture control input area for the electronic display screen based on the detected calibration pattern,
   wherein determining a touchless gesture control input area comprises a definition of a virtual screen layer being essentially parallel to the electronic display screen and/or a definition of dimensions of the electronic display screen and/or a definition of a coordinate system.

18. The computer-implemented method of claim 17, wherein the coordinate system comprises a cartesian coordinate system with an x-axis and a y-axis, each being parallel to the electronic display screen, and a z-axis being orthogonal to the electronic display screen.

* * * * *

UNITED STATES PATENT AND TRADEMARK OFFICE
CERTIFICATE OF CORRECTION

PATENT NO. : 11,921,934 B2
APPLICATION NO. : 17/896803
DATED : March 5, 2024
INVENTOR(S) : Ihor Vilkhovyi et al.

Page 1 of 1

It is certified that error appears in the above-identified patent and that said Letters Patent is hereby corrected as shown below:

In the Claims

At Column 17, Line 48, "claim 10," should be -- claim 12, --.

Signed and Sealed this
Twenty-fifth Day of February, 2025

Coke Morgan Stewart
*Acting Director of the United States Patent and Trademark Office*